United States Patent [19]

Ikegami et al.

[11] Patent Number: 4,807,252
[45] Date of Patent: Feb. 21, 1989

[54] DIGITAL COMMUNICATION SYSTEM

[75] Inventors: Fumio Ikegami, 5-7010 Yuniuji Manshion, 34-10 Kohatauchihata, Uji-shi, Kyoto-fu; Susumu Yoshida, Kyoto; Tsutomu Takeuchi, Kyoto; Sirikiat Ariyavisitakul, Kyoto, all of Japan

[73] Assignees: Fumio Ikegami; Mitsubishi Denki Kabushiki Kaisha, both of Japan

[21] Appl. No.: 46,787

[22] Filed: May 7, 1987

[30] Foreign Application Priority Data

May 13, 1986 [JP] Japan .................. 61-111672

[51] Int. Cl.$^4$ .......................... H04L 27/18
[52] U.S. Cl. ...................... 375/53; 332/9 R; 332/16 R; 375/57
[58] Field of Search .............. 375/52, 53, 54, 57, 375/67, 83, 84, 85, 86, 101; 329/104, 105, 110; 332/9 R, 10, 16, 21, 22, 23 R

[56] References Cited

U.S. PATENT DOCUMENTS

| | | | |
|---|---|---|---|
| 2,870,431 | 1/1959 | Babcock | 375/53 |
| 3,100,890 | 8/1953 | Henning | 375/53 |
| 4,130,802 | 12/1978 | Nossen et al. | 375/55 |
| 4,417,219 | 11/1983 | Brossard et al. | 375/53 |
| 4,726,038 | 2/1988 | Ikegami et al. | 375/57 X |

OTHER PUBLICATIONS

Institute of Electronics and Communication Engineers, Aug. 30, 1984, "A Modulation Technique Suffering from Less Timing Fluctuation of Eye Patterns in Multipath Fading", pp. 41–47.

M. Poppe "Double Phase-Shift Keying Speeds Over Voice Channels" Electronics, vol. 39, No. 22 (Oct. 1966) pp. 91,94.

S. Yoshida et al "A Novel Anti-Multipath Modulation Technique DSK" IEEE Global Telecommunications Conference, Globecom '85, vol. 3, New Orleans, (Dec. 2–5, 1985) 36.4.1, 36.4.5.

*Primary Examiner*—Benedict Safourek
*Attorney, Agent, or Firm*—Lowe, Price, LeBlanc, Becker & Shur

[57] ABSTRACT

The present invention provides a digital communication system in which one time slot is divided into a first half section and a second half section and the carrier phase difference $\theta$ between each neighboring first half section is set to either ($\pi$, 0) with respect to a binary information symbol (1,0) or (0, $\pi/2$, $\pi$, $3/2\pi$) with respect to a quaternary information symbol (11, 01, 00, 10). In addition, the phase difference $\psi$ between the first half and the second half of any time slot is a constant value $\psi_0$ (for example, $\pi$rad) irrespective of the symbol, or $\psi_i$ determined with respect to a symbol (for example, $+\pi/2$ with respect to a symbol 1 or $-\pi/2$ with respect to a symbol 0). Therefore, an arbitrary complementary characteristic can be obtained when differentially demodulated in a multipath fading channel, irrespective of the amplitude characteristic of a demodulation signal.

16 Claims, 8 Drawing Sheets

(A) BINARY INFORMATION SYMBOL (B) $\left(\frac{\Delta\theta}{2}\right)$DSK PHASE DIAGRAM ial detector shown in FIG. 2, a demodulation output e(t) is represented by the following expressions:

DIGITAL COMMUNICATION SYSTEM

BACKGROUND OF THE INVENTION

1. Field of the Invention

The present invention relates to a digital communication system. More particularly, it relates to a digital communication system employed in mobile radio communication which is immune from multipath interference.

2. Description of the Prior Art

The inventors proposed "A MODULATION TECHNIQUE SUFFERING FROM LESS TIMING FLUCTUATION OF EYE PATTERNS IN MULTIPATH FADING", in a technical meeting sponsored by the Institute of Electronics and Communication Engineers in Japan held on Aug. 30, 1984. This article describes a DSK (Double Phase Shift Keying) of a type in which a phase is shifted every half time slot by $\pi/2$. However, an amount of phase-shift is not limited to $\pi/2$, but any amount $\Delta\theta/2$ may be taken, which is referred to as "$\Delta\theta/2$-DSK".

FIG. 1 is a diagram for explaining a $\Delta\theta/2$-DSK signal, FIG. 2 is a diagram showing a T/2 differential detector, FIG. 3 is a diagram showing the relation between a D wave and a U wave, and FIG. 4 is a diagram showing demodulation outputs in sections b and d and a section c in the $\Delta\theta/2$-DSK signal.

The $\Delta\theta/2$-DSK signal shown in FIG. 1 is such that the phase of a carrier wave is shifted by $+\Delta\theta/2$ during a period of T/2 in the first half of a time slot and further by $\Delta\theta/2$ during a period of T/2 in the second half thereof clockwise or counterclockwise, in correspondence to a digital binary information symbol. In order to demodulate an original binary information symbol from the $\Delta\theta/2$-DSK signal shown in FIG. 1, a T/2 differential detector 3 shown in FIG. 2 is employed. In FIG. 2, the $\Delta\theta/2$-DSK signal is applied to an input terminal 1, and also to a delay circuit 3a having a delay length of T/2. The $\Delta\theta/2$-DSK signal is multiplied by its replica delayed by T/2 by a multiplier 2. An output of the multiplier 2 is taken out through a low pass filter 4 to an output terminal 5.

Referring now to FIGS. 1 and 2, description is made on operation of a demodulator. The $\Delta\theta/2$-DSK signal is such that the phase of the carrier wave is shifted by $+\Delta\theta/2$ during a period of T/2 in the first half time slot and further by $+\Delta\theta/2$ during a period of T/2 in the second half time slot for a binary information symbol "1", while the phase of the carrier wave is shifted by $-\Delta\theta/2$ during a period of T/2 in the first half time slot and further by $-\Delta\theta/2$ during a period of T/2 in the second half time slot for a binary information symbol "0".

Description is now made on operation of this system in multipath propagation which causes a problem in mobile radio. Assuming that $\tau$ is an arrival time difference between the D wave and the U wave which are the $\Delta\theta/2$-DSK signals having the identical content and received through two routes having different propagation path lengths, the relation is shown in FIG. 3. Even when the D wave and the U wave are out-of-phase and cancel with each other in sections b and d, the phase difference between th D and U waves in the section c is $\Delta\theta/2$, thus the resultant of the D and U waves is not canceled.

When a combined wave of the D wave and the U wave having such a relation is demodulated in the T/2 differensection $a$:

$$2e(t) = \begin{cases} (\cos\Delta\theta/2) \cdot (1 - \rho^2) & \text{symbol } 0 \to 1 \\ (\cos\Delta\theta/2) \cdot (1 + \rho^2 + 2\rho\cos(\Delta\theta/2 - \phi)) & \text{symbol } 1 \to 1 \\ -(\cos\Delta\theta/2) \cdot (1 - \rho^2) & \text{symbol } 1 \to 0 \\ -(\cos\Delta\theta/2) \cdot (1 + \rho^2 + 2\rho\cos(\Delta\theta/2 + \phi)) & \text{symbol } 0 \to 0 \end{cases}$$

sections $b,d$:

$$2e(t) = \begin{cases} (\cos\Delta\theta/2) \cdot (1 + \rho^2 + 2\rho\cos\phi) & \text{symbol } 1 \\ -(\cos\Delta\theta/2) \cdot (1 + \rho^2 + 2\rho\cos\phi) & \text{symbol } 0 \end{cases}$$

section $c$:

$$2e(t) = \begin{cases} (\cos\Delta\theta/2) \cdot (1 + \rho^2 + 2\rho\cos(\Delta\theta/2 - \phi)) & \text{symbol } 1 \\ -(\cos\Delta\theta/2) \cdot (1 + \rho^2 + 2\rho\cos(\Delta\theta/2 + \phi)) & \text{symbol } 0 \end{cases}$$

where $\cos\Delta\theta/2$ is referred to as the amplitude coefficient, $\rho$ represents the relative amplitude ratio of the U wave to the D wave and $\phi$ represents the carrier phase difference between the D wave and the U wave. The relation between the outputs in sections b, d and in section c is illustrated in FIG. 4.

As seen from FIG. 4, in the $\Delta\theta/2$-DSK signal, the demodulation outputs in the sections b and d and in the section c are in compensating relation with respect to the change of the carrier phase difference $\phi$, such that one is decreased while the other is increased.

More specifically, in a simple BPSK (Binary Phase Shift Keying) signal, when the phase difference $\phi$ between the D wave and the U wave approaches to $\pi$ (rad), the demodulation output is reduced to cause bit errors, while in the $\Delta\theta/2$-DSK signal, even if the phase difference $\phi$ takes on arbitrary values, the demodulation signal does not drop seriously owing to the compensation mechanism described above. As a result, the bit errors rate is extremely reduced.

Since the $\Delta\theta/2$-DSK signal is constructed as described above, the bit error rate is remarkably improved, as compared with the BPSK signal. However, $\Delta\theta/2$ could not be selected so that the best signal to noise ratio and complementary characteristics shown in FIG. 4 may be obtained, since the amount of $\Delta\theta/2$ was related to the both amplitude coefficient $\cos(\Delta\theta/2)$ and the complementary characteristic (the relation between output signals in the sections b and d and the section c).

SUMMARY OF THE INVENTION

Therefore, a principal object of the present invention is to provide a digital communication system having a signal in which the best amplitude coefficient and the optimum complementary characteristic can be chosen independently.

Briefly stated, the present invention employs a ($\theta$, $\psi$)DSK signal characterized in that one time slot corresponding to a digital information symbol is divided into a first half section and a second half section and the carrier phase in each section is shifted as follows.

The element $\theta$ (with respect to amplitude coefficient) is determined in correspondence to a symbol. For example, $\theta$ equals ($\psi$, 0) with respect to a binary information symbol (1, 0) and (0, $\pi/2$, $\pi$, $3\pi/2$) with respect to quaternary information symbol (11, 01, 00, 10).

It is assumed that a phase difference $\psi$ between the first half and the second half of a time slot is a constant value $\psi_0$ irrespective of a symbol (for example, $\pi$rad) or $\psi_i$ determined in correspondence to a symbol (for example, $+\pi/2$ with respect to a symbol "1" and $-\pi/2$ with respect to a symbol "0").

The phase shift is performed in the first half and the second half of a time slot such that the phase shift amount $\psi$ in the center of a time slot and the phase shift amount $\theta$ between adjacent bits are set independently, accordingly an arbitrary complementary characteristic can be obtained without being influenced by amplitude coefficient of a demodulation signal with respect to change in the phase difference $\phi$ between a D wave and a U wave.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
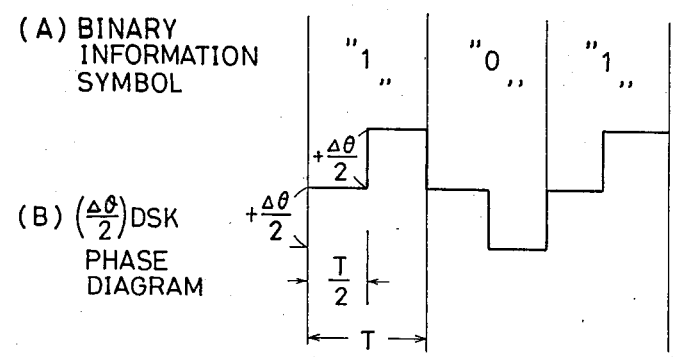
FIG. 1 is a diagram for explaining a $\Delta\theta/2$-DSK signal.
Figure 2:
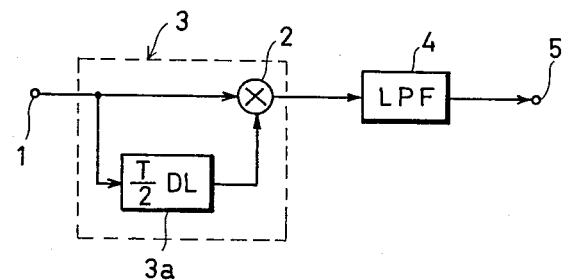
FIG. 2 is a block diagram showing a T/2 differential detector.
Figure 3:
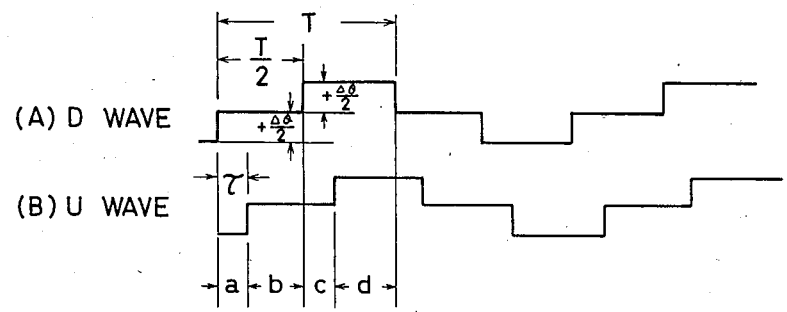
FIG. 3 is a diagram showing the relation between a D wave and a U wave.
Figure 4:
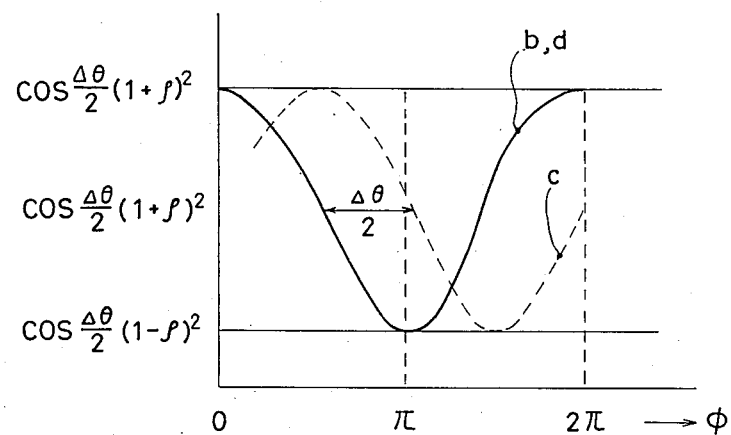
FIG. 4 is a diagram showing demodulation outputs in sections b and d and a section c of a $\Delta\theta/2$-DSK signal.
Figure 5:
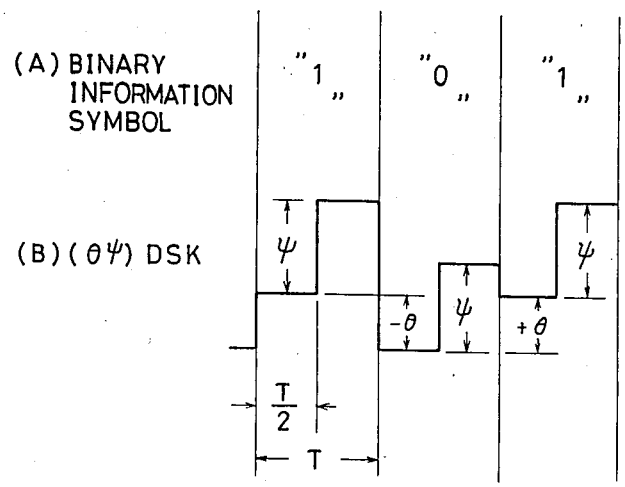
FIG. 5 is a diagram for explaining a ($\theta$, $\psi$)DSK signal.

FIG. 5 is a diagram for explaining a ($\theta$, $\psi$)DSK signal employed in a digital communication system according to the present invention.

In FIG. 5, the ($\theta$, $\psi$)DSK signal corresponding to binary information symbols "1", "0" and "1" is shown.

In this example, $\theta_i$ equals $+\theta$ with respect to a symbol "1" and $\theta_i$ equals $-\theta$ with respect to a symbol "0". In addition, the phase shift amount within one time slot is a constant value $\psi$ irrespective of the symbol.

Figure 6:
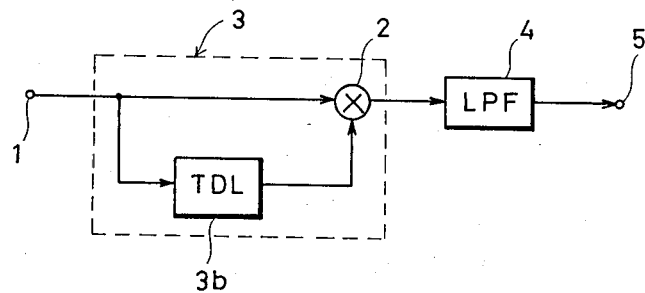
FIG. 6 is a diagram showing a T differential detector.

FIG. 6 is a block diagram showing a T differential detector for demodulating the ($\theta$, $\psi$)DSK signal. In FIG. 6, the ($\theta$, $\psi$)DSK signal is applied to a T delay circuit 3b and a multiplier 2 through an input terminal 1. T denotes the length of one time slot. An output of the multiplier 2 is outputted to an output terminal 5 through a low pass filter 4.

Figure 7:
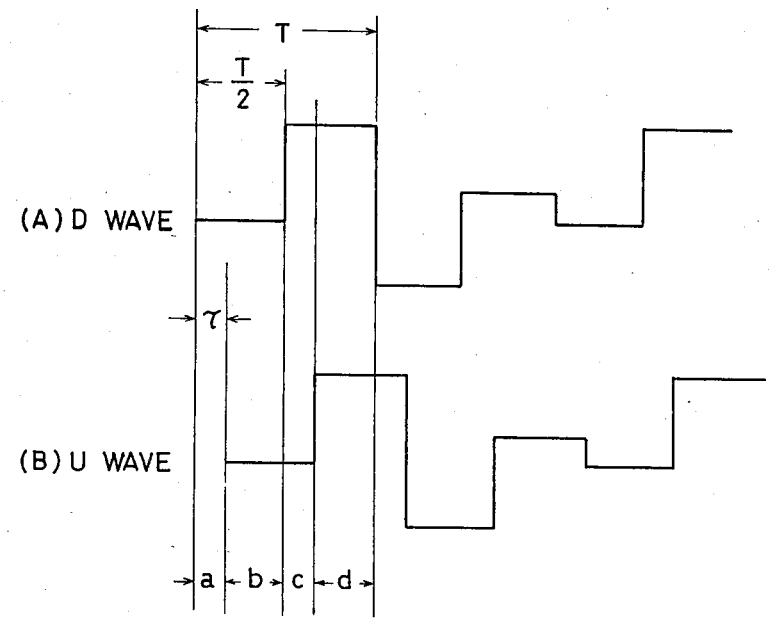
FIG. 7 is a diagram showing the relation between a D wave and a U wave.
Figure 8:
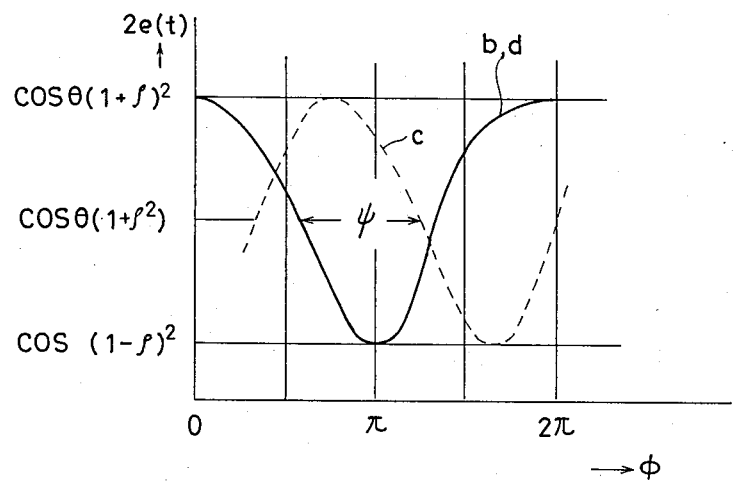
FIG. 8 is a diagram showing demodulation outputs in sections b and d and a section c.

FIG. 7 is a diagram showing the relation between a D wave and a U wave, and FIG. 8 is a diagram showing demodulation outputs in sections b and d and a section c.

Referring now to FIGS. 7 and 8, description is made on operation of the T differential detector shown in FIG. 6. Assuming that $\tau$ is an arrival time difference between the D wave and the U wave which are the ($\theta$, $\psi$)DSK signals having the identical content and received through two routes having different propagation path lengths, the relation is shown in FIG. 7.

When a combined wave of the D wave and the U wave having such a relation is demodulated in the T differential detector shown in FIG. 6, a demodulation output e(t) is represented in the following expressions:

section a:
$$2e(t) = \begin{cases} \cos\theta \cdot (1 + \rho^2 + 2\rho\cos(\phi + \phi - \theta)) & \text{symbol } 1 \rightarrow 1 \\ \cos\theta \cdot (1 - \rho^2) & \text{symbol } 0 \rightarrow 1 \\ -\cos\theta \cdot (1 + \rho^2 - 2\rho\cos(\phi + \phi + \theta)) & \text{symbol } 0 \rightarrow 0 \\ -\cos\theta(1 - \rho^2) & \text{symbol } 1 \rightarrow 0 \end{cases}$$

sections b and d:
$$2e(t) = \begin{cases} \cos\theta \cdot (1 + \rho^2 + 2\rho\cos\phi) & \text{symbol } 1 \\ -\cos\theta \cdot (1 + \rho^2 + 2\rho\cos\phi) & \text{symbol } 0 \end{cases}$$

section c:
$$2e(t) = \begin{cases} \cos\theta \cdot (1 + \rho^2 + 2\rho\cos(\phi - \phi)) & \text{symbol } 1 \\ -\cos\theta \cdot (1 + \rho^2 + 2\rho\cos(\phi - \phi)) & \text{symbol } 0 \end{cases}$$

where $\rho$ represents the relative amplitude ratio of the U wave to the D wave and $\phi$ represents the carrier phase difference between the D wave and the U wave.

The relation is illustrated in FIG. 8. As seen from FIG. 8, the ($\theta$, $\psi$)DSK signal is similar to a $\Delta\theta/2$-DSK signal in that the demodulation outputs in the sections b and d and in the section c are in compensating relation with respect to change in the carrier phase difference $\phi$ between the D wave and the U wave. However, $\theta$ is associated with only the amplitude of an output signal and $\psi$ is associated with only the compensating relation with respect to change in the amplitude of output signals in the sections b and d and the section c, so that improvement is made in that the best $\theta$ and $\psi$ can be selected independently.

Since both $\theta$ and $\psi$ can be thus set independently, the amplitude of the output signal can be increased and the best complementary characteristic can be set. More specifically, in the case of $\theta=(\pi\,\text{rad},\,0\,\text{rad})$ in correspondence to a binary information symbol (1, 0), and $\psi=\pi$, the amplitude is largest, i.e., (+1, −1) with respect to two symbols (1, 0), and also the complementary characteristic becomes best such that one is smallest while the other is largest with respect to the change in the amplitude in the sections b and d and the section c.

Figure 9:
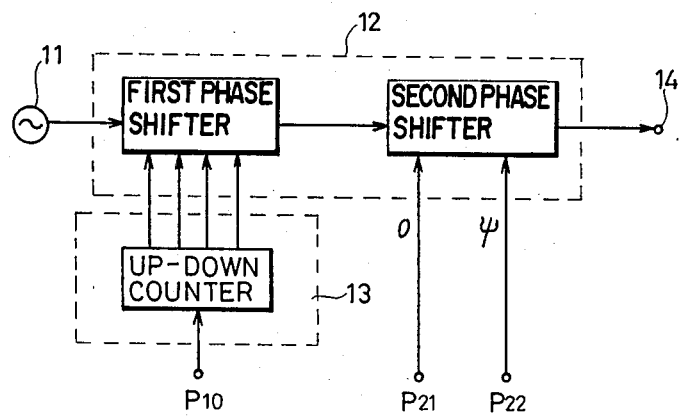
FIG. 9 is a diagram showing an example of a circuit for generating a ($\theta$, $\psi$)DSK signal.

FIG. 9 is a schematic block diagram showing an example of a $(\theta, \psi)$DSK signal generator. In FIG. 9, a carrier wave sent by a carrier wave generator 11 is applied to a phase shifter 12. The phase shifter 12 comprises a first phase shifter 121 and a second phase shifter 122. In the first phase shifter 121, the phase shift amount is controlled to clockwise or counter clockwise by an up-down counter 13. More specifically, the up-down counter 13 counts digital information applied to a terminal $P_{10}$, that is, counts up or counts down depending on the symbol, and controls the tap of the first phase shifter 121 by the output, so that the phase shift amount is controlled. The second phase shifter 122 has a terminal $P_{21}$ to which a signal in the first half of one time slot is applied and a terminal $P_{22}$ to which a signal in the second half thereof is applied, and the phase shift is performed by $\psi$ in the second half of a time slot, with respect to the phase applied to the carrier wave in the first half thereof. A $(\theta, \psi)$DSK signal generator may be more easily implemented by use of programmable read only memories (PROM's), in which precalculated inphase and quadrature baseband waveforms are stored and selectively read out.

Figure 10:
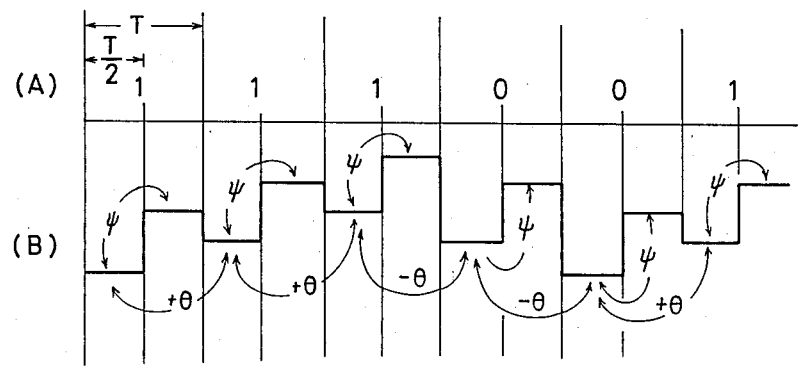
FIG. 10 is a diagram for explaining operation of the circuit shown in FIG. 9.

FIG. 10 is a diagram of timing for explaining operation of the $(\theta, \psi)$DSK signal generator shown in FIG. 9. In FIG. 10, (A) denotes a binary information signal sent to the terminal $P_{10}$ for each time slot, and (B) denotes the $(\theta, \psi)$DSK signal in which the shift is performed by $(+\theta, \psi)$ in correspondence to a symbol "1" and by $(-\theta, \psi)$ in correspondence to a symbol "0". These signals are generated as described below. More specifically, the up-down counter 13 counts up when the symbol of the binary information signal applied to the terminal $P_{10}$ is "1", and counts down when it is "0". The up-down counter 13 provides data corresponding to the count value to the first phase shifter 121.

More specifically, the tap corresponding to the phase shift amount in the first phase shifter 121 can be set in correspondence to the tap of the up-down counter 13. For example, the phase shift amount in the first phase shifter 121 is $\theta$ when the count value is 1, $2\theta$ when the count value is 2, $n\theta$ $(=2\pi)$ when the count value is n, and is returned to $\theta$ when the count value is (n+1), provided that $\theta=2\pi/n$.

Since the phase shift in the second phase shifter 122 is set such that the phase difference of $\psi$ may occur between the terminals $P_{21}$ and $P_{22}$, a signal applied to the terminal $P_{21}$ is controlled in the first half of a time slot and a signal applied to the terminal $P_{22}$ is controlled in the second half thereof, so that the phase difference of $\psi$ occurs between the first half and the second half of a time slot. The second phase shifter 122 is controlled by the signal applied to the terminal $P_{21}$ in the first half of the next time slot, so that it can be returned to the starting point. Thus, every time a symbol "1" is inputted, the up-down counter 13 counts up, so that the phase of adjacent time slots is advanced by $\theta$. In the second half of the time slot, the phase of the adjacent time slots is advanced by $\psi$ by the second phase shifter 122. On the other hand, every time a symbol "0" is inputted, the up-down counter 13 counts down, so that the phase is delayed by $\theta$. In the second half of the time slot, the phase is advanced by $\psi$.

Figure 11:
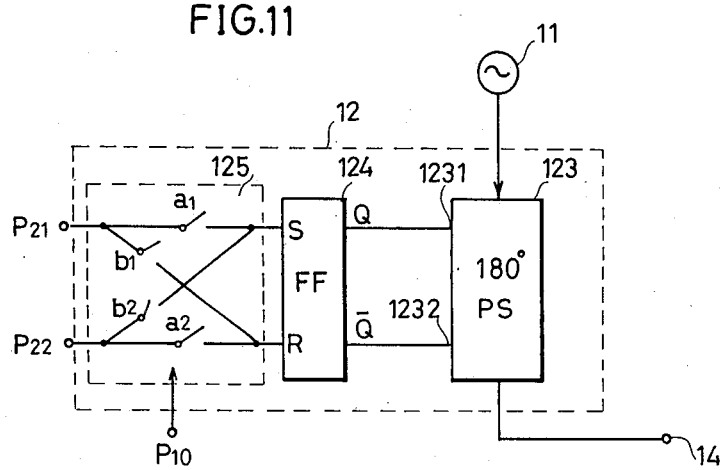
FIG. 11 is a block diagram showing another example of a circuit for generating a ($\theta$, $\psi$)DSK signal.
Figure 12:
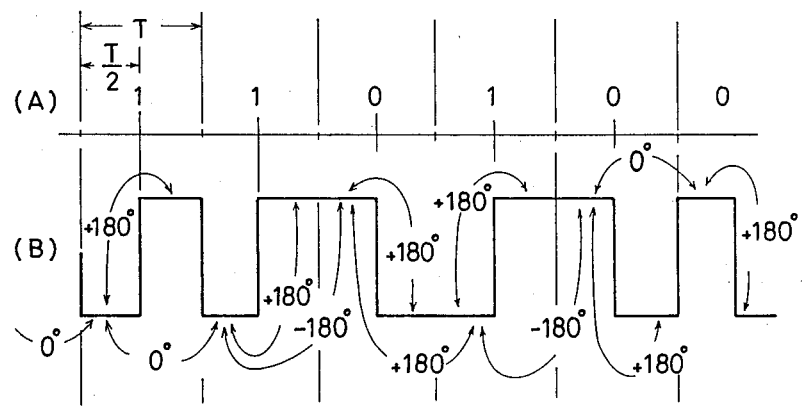
FIG. 12 is a diagram for explaining operation of the circuit shown in FIG. 11.

FIG. 11 is a block diagram showing an example of the $(\theta, \psi)$DSK signal generator in the case of $(\theta, \psi)=(0°, 180°)$ with respect to a symbol "1" and $(\theta, \psi)=(180°, 180°)$ with respect to a symbol "0". FIG. 12 is a timing diagram showing the binary information signal and the phase of the carrier wave corresponding thereto.

In FIG. 11, the phase shifter 12 comprises a 180° phase shifter 123, an RS flip-flop 124 and a switching circuit 125. In the 180° phase shifter 123, when the phase of a signal applied from a carrier wave generator 11 shifts from one of the two input terminals 1231 and 1232 to the other, the phase shifts by 180°. The switching circuit 125 has two sets of switches $a_1$, $a_2$ and $b_1$, $b_2$.

Referring now to FIG. 12, description is made on operation shown in FIG. 11. (A) denotes a binary information signal and (B) denotes the phase shift diagram of the $(\theta, \psi)$DSK signal.

When a binary information symbol "1" is applied to the input terminal $P_{10}$, the switches $a_1$ and $a_2$ of the switching circuit 125 are closed, so that the flip-flop 124 is set by a signal applied to the input terminal $P_{21}$ indicative of the first half of a time slot. When the flip-flop 124 is set, a signal at an "H" level is outputted to the Q terminal. The 180° phase shifter 123 is driven by the signal at an "H" level, so that the absolute phase is set to 0°. In the second half of the time slot, the flip-flop 124 is reset by a signal indicative of the second half of a time slot, which signal is inputted to the input terminal $P_{22}$, so that a signal at an "H" level is outputted to the $\overline{Q}$ terminal. The 180° phase shifter 123 is driven by the signal at an "H" level, so that the relative phase is set to 180°.

When a binary information symbol "0" is applied to the input terminal $P_{10}$, the switches $b_1$ and $b_2$ of the switching circuit 125 are closed, so that the flip-flop 124 is reset by a signal indicative of the first half of a time slot, which signal is applied to the input terminal $P_{21}$, so that a signal at an "H" level is outputted to the $\overline{Q}$ terminal. The 180° phase shifter 123 is driven by the signal at an "H" level, so that the relative phase is set to 180°. In the second half of the time slot, the flip-flop 124 is set by a signal indicative of the second half of a time slot, which signal is inputted to the input terminal $P_{22}$, so that a signal at an "H" level is outputted to the Q terminal. The 180° phase shifter 123 is driven by the signal, so that the relative phase is set to 0°.

Figure 13:
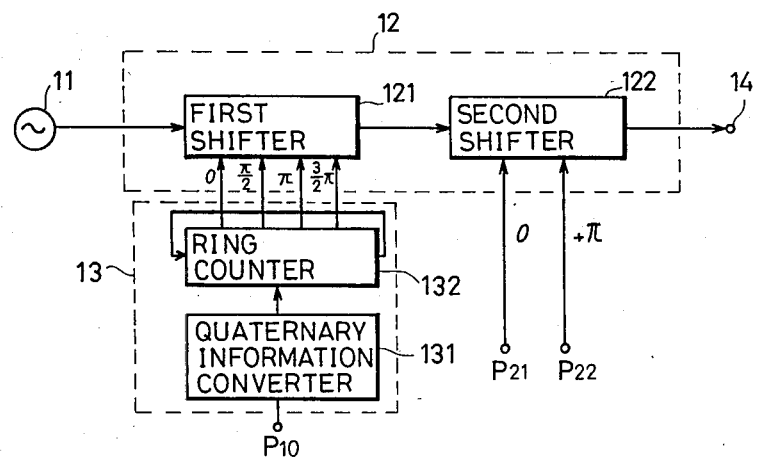
FIG. 13 is a block diagram showing another example of a circuit for generating a ($\theta$, $\psi$)DSK signal.

FIG. 13 is a schematic block diagram showing an example of the $(\theta, \psi)$DSK signal generator corresponding to a quaternary information signal. In FIG. 13, the first shifter 121 switches the relative phase into four phases (0°, 90°, 180°, 270°) by selecting the tap. The counter 13 comprises a quaternary information converter 131 and a ring counter 32. The quaternary information converter 131 converts into a decimal number information per time slot of each quaternary information signal including a quaternary information symbol (11, 01, 00, 10). The ring counter 132 including four bits counts output of the quaternary information converter 131.

Figure 14:
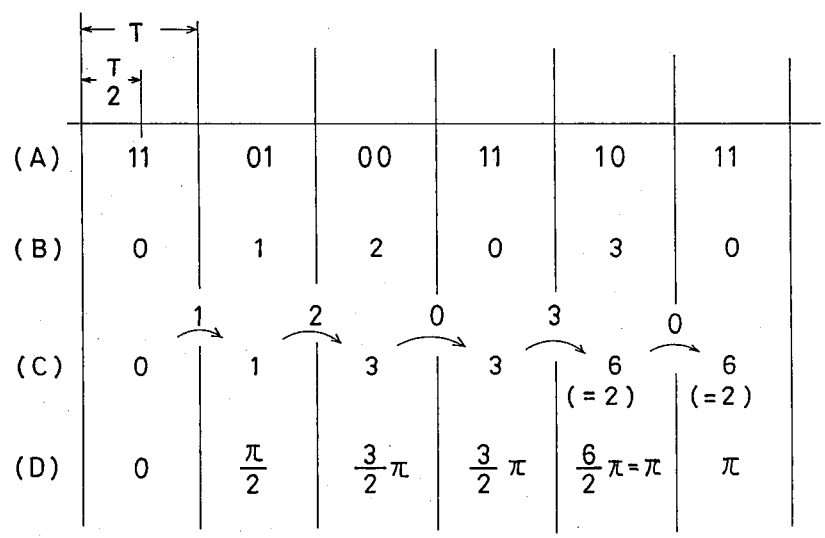
FIG. 14 is a diagram for explaining operation of the circuit shown in FIG. 13.

FIG. 14 is a diagram for explaining operation of the $(\theta, \psi)$DSK signal generator shown in FIG. 13. In FIG. 14, (A) denotes a quaternary information symbol inputted from the terminal $P_{10}$, (B) denotes a value of a decimal number into which information in each time slot of the quaternary information signal is converted, (C)

denotes a numerical value in which quaternary information in each time slot is read by the ring counter and (D) denotes a phase value as set when the tap of the first phase shifter 121 corresponding to this numerical value is driven.

In the second phase shifter 122, a signal indicative of the first half of a time slot is applied to the terminal P$_{21}$ as in the example shown in FIG. 11, and a signal indicative of the second half of a time slot is applied to the terminal p$_{22}$, so that the phase difference between the first half and the second half is set to $\psi$.

Figure 15:
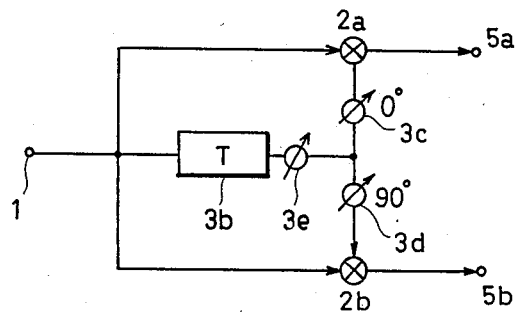
FIG. 15 is a schematic block diagram showing a structure of the T differential detector corresponding to a quaternary information symbol.

FIG. 15 is a schematic block diagram showing a structure of a T differential detector corresponding to the quaternary information symbol. The T differential detector shown in FIG. 15 specifies the content of a signal depending on the phase difference between the present signal and a signal preceding by one bit. When the ($\theta$, $\psi$)DSK signal generated as described above is applied to the T differential detector, the quaternary information signal applied to the terminal P$_{10}$ can be reproduced. More specifically, in FIG. 15, an output of the T delay circuit 3b is connected to a correcting-phase adjuster 3e, an output of the correcting-phase adjuster 3e is connected to a 0° phase adjuster 3c and a 90° phase adjuster 3d, and an output of the 0° phase adjuster 3c is connected to an I$_{CH}$ multiplier 2a. In addition, an output of the 90° phase adjuster 3d is connected to a Q$_{CH}$ multiplier 2b. The I$_{CH}$ multiplier 2a multiplies a signal applied to the input terminal 1 by the output of the 0° phase adjuster 3c, the product thereof being applied to an output terminal 5a, while the Q$_{CH}$ multiplier 2b multiplies a signal inputted to the input terminal 1 by the output of the 90° phase adjuster 3d, the product thereof being applied to an output terminal 5b.

Figure 16:
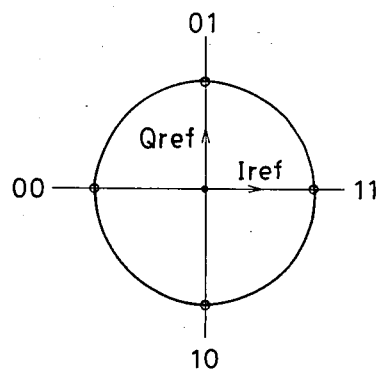
FIG. 16 is a diagram for explaining operation of the T differential detector shown in FIG. 15.

FIG. 16 is a diagram for explaining operation of the T differential detector shown in FIG. 15.

Referring now to FIGS. 15 and 16, description is made on operation of the T differential detector. The signal applied to the input terminal 1 is directly sent to one terminal of each of the I$_{CH}$ multiplier 2a and the Q$_{CH}$ multiplier 2b. The input signal is also applied to the T differential detector 3b, so that it is delayed by one time slot. The delayed input signal is sent to the other input terminal of the I$_{CH}$ multiplier 2a through the correcting-phase adjuster 3e and the 0° phase adjuster 3c, and is also applied to the other input terminal of the Q$_{CH}$ multiplier 2b through the correcting-phase adjuster 3e and the 90° phase adjuster 3d. The correcting-phase adjuster 3e, the 0° phase adjuster 3c and the 90° phase adjuster 3d are set such that the phase difference between the input terminal 1 and two input terminals of the I$_{CH}$ multiplier 2a may be 360°×n+90°.

Thus, the phase relation is considered in the same manner as phase detection in which the input signal of the quaternary information symbol (11, 01, 00, 10) having the relation shown in FIG. 16 utilizes the phase of a preceding symbol prior to one time slot T as a reference wave. As a result, an I$_{CH}$ output outputted to the output terminal 5a, a Q$_{CH}$ output outputted to the output terminal 5b and the quaternary information symbol have the following relation, so that the quaternary information signal represented by the signal inputted to the terminal 1 can be read.

| | | |
|---|---|---|
| 11 (the phase difference between the present bit and a preceding bit = 0°) | I$_{CH}$ output = 1, | Q$_{CH}$ output = 0 |
| 01 (the phase difference between the present bit and a preceding bit = 90°) | I$_{CH}$ output = 0, | Q$_{CH}$ output = 1 |
| 00 (the phase difference between the present bit and a preceding bit = 180°) | I$_{CH}$ output = −1, | Q$_{CH}$ output = 0 |
| 10 (the phase difference between the present bit and a preceding bit = 270°) | I$_{CH}$ output = 0, | Q$_{CH}$ output = −1 |

Assuming that $\psi$ equals ($\frac{1}{2}$)$\theta$i, it is the same as the conventional $\Delta\theta$/2-DSK to which the quaternary information symbol is applied. In addition, although it has been described that the phase is shifted in a stepped manner, the phase may be shifted, for example, in a Raised Cosine manner to reduce divergence of spectrum.

As described in the foregoing, since in a digital communication system according to the present invention, the phase shift is performed in the first half and the second half of a time slot when the phase of a carrier wave signal is shifted in correspondence to digital information, and the amount $\psi$ of phase shift in a time slot and the amount $\theta$ of phase shift between bits are set independently, an arbitrary complementary characteristic can be obtained irrespective of the amplitude characteristic of a demodulation signal with respect to change in phase difference $\phi$ between a D wave and an U wave.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital communications system employing a carrier wave comprised of a plurality of time slots and having a variable phase $\theta$, said digital communications system further including a modulating signal having encoded therein a plurality of digital information symbol sequences, said modulating signal for shifting the phase $\theta$ of said carrier wave responsive to said digital information symbol sequences, the digital communication system having an improved transmission bit error rate of said digital information symbol sequences, comprising:

first means for controlling a non-zero phase change $\phi$ of the carrier within a time slot of said plurality of time slots so that said phase change $\phi$ is established between any position in a first half of said time slot and any other position in a second half of the time slot, the two positions being separated from each other by $\frac{1}{2}$ time slot; and second means for setting a phase difference in the carrier between any position in said time slot and any other position in an adjacent time slot to a discrete angle $\theta$i, wherein $\theta$i is a non-zero integral multiple of $\phi$.

2. A digital communication system employing a carrier wave comprised of a plurality of time slots and having a variable phase $\theta$, said digital communications system further including a modulating signal having encoded therein a plurality of digital information symbol sequences, said modulating signal for shifting the phase θ of said carrier wave responsive to said digital information symbol sequences, comprising:

first means for controlling a phase change φ of the carrier within a time slot of said plurality of time slots so that said phase change φ is established between any position in a first half of said time slot and any other position in a second half of the time slot, the two portions being separated from each other by ½ time slot; and second means for setting a phase difference in the carrier between any position in said time slot and nay other position in an adjacent time slot to a discrete angle θi, wherein said phase change φ of said carrier is equal to π radians and said angle θi is equal to (0, π) radians to represent a binary signal of symbols (0,1).

3. A digital communication system employing a carrier wave comprised of a plurality of time slots and having a variable phase θ, said digital communications system further including a modulating signal having encoded therein a plurality of digital information symbol sequences, said modulating signal for shifting the phase θ of said carrier wave responsive to said digital information symbol sequences, the digital communication system having an improved transmission bit error rate of said digital information symbol sequences, comprising:

first means for controlling a phase change φ of the carrier within a time slot of said plurality of time slots so that said phase change φ is established between any position in a first half of said time slot and any other position in a second half of the time slot, the two positions being separated from each other by ½ time slot; and second means for setting a phase difference in the carrier between any position in said time slot and any other position in an adjacent time slot to a discrete angle θi, wherein said phase change φ is equal to 180° and said angle θi is set equal to either $(\theta, \pi+\theta)$, $(\theta, \pi-\theta)$ or $)\theta, -\theta)$ with respect to the binary signal of symbols (0,1).

4. A digital communication system employing a carrier wave comprised of a plurality of time slots and having a variable phase θ, said digital communications system further including a modulating signal having encoded therein a plurality of digital information symbol sequences, said modulating signal for shifting the phase θ of said carrier wave responsive to said digital information symbol sequences, the digital communication system having an improved transmission bit error rate of said digital information symbol sequences, comprising:

first means for controlling a phase φ of the carrier within a time slot of said plurality of time slots so that said phase change φ is established between any position in a first half of said time slot and any other position in a second half of the time slot, the two positions being separated from each other by ½ time slot; and second means for setting a phase difference in the carrier between any position in said time slot and any other position in an adjacent time slot to a discrete angle θi, wherein said phase change φ is equal to 180° and said angle θi is equal to $(+\theta, \pi/2+\theta, \pi+\theta, (3/2)\pi+\theta)$ radians with respect to a quaternary signal of symbols (11, 01, 00, 10).

5. A digital communication system employing a carrier wave comprised of a plurality of time slots and having a variable phase θ, said digital communications system further including a modulating signal having encoded therein a plurality of digital information symbol sequences, said modulating signal for shifting the phase θ of said carrier wave responsive to said digital information symbol sequences, the digital communication system having an improved transmission bit error rate of said digital information symbol sequences, comprising:

first means for controlling a phase change φ of the carrier within a time slot of said plurality of time slots so that said phase change φ is established between any position in a first half of said time slot and any other position in a second half of the time slot, the two positions being separated from each other by ½ time slot; and second means for setting a phase difference in the carrier between any position in said time slot and any other position in an adjacent time slot to a discrete angle θi, wherein said phase change φ is equal to $\pi/2 < \phi < (3/2\pi$ or $-\pi/2 > \phi > (-3/2)\pi$.

6. A digital communication system employing a carrier wave comprised of a plurality of time slots and having a variable phase θ, said digital communications system further including a modulating signal having encoded therein a plurality of digital information symbol sequences, said modulating signal for shifting the phase of said carrier wave responsive to said digital information symbol sequences, the digital communication system having an improved transmission bit error rate of said digital information symbol sequences, comprising:

first means for controlling a phase change φ of the carrier within a time slot of said plurality of time slots so that said phase change φ is established between any position in a first half of said time slot and any other position in a second half of the time slot, the two positions being separated from each other by ½ time slot; and second means for setting a phase difference in the carrier between any position in said time slot and any other position in an adjacent time slot to a discrete angle θi, wherein said modulating signal is a Raised Cosine curve.

7. A digital communication system having an improved transmission bit error rate of digital information symbols transmitted through a transmission medium formed by a multipath channel wherein each path has a substantially different transmission time, said digital communication system comprising:

transmission means for generating and transmitting a carrier signal through said transmission medium, including modulating means for setting a phase of said carrier signal during first and second halves of each of predetermined time slots to respective predetermined different phases ψ in correspondence with digital information symbols sent out at each of said predetermined time slots, and means for setting the phase difference between corresponding positions in adjacent ones of said predetermined time slots to a phase θi set in correspondence to a code of digital information symbols, receiving means for receiving said transmitted carrier signal through said transmission medium; and demodulating means for dividing a signal received by said receiving means into two signals, delaying by one time slot one of the two signals to obtain a delayed signal, multiplying the delayed signal by the other one of said two signals to obtain a product signal and integrating said product signal to obtain the original digital information signal.

8. A digital communication system in accordance with claim 7, wherein
said modulating means sets said phase $\psi$ to $\pi$ radians and said phase $\theta i$ to $(0, \pi)$ radians with respect to a binary information of symbols $(0,1)$.

9. A digital communication system in accordance with claim 8, wherein
said phase is shifted in a raised cosine manner.

10. A digital communication system in accordance with claim 7, wherein
said modulating means sets said phase $\psi$ to $\pi$ radians and said phase $\theta i$ to $(\alpha, \pi - \alpha)$ radians, or $(\alpha, \pi - \alpha)$ radians or $(-\alpha, +\alpha)$ radians with respect to a binary digital information of symbols $(0, 1)$ where $\alpha$ is an arbitrary angle.

11. A digital communication system in accordance with claim 10, wherein
said phase is shifted in a raised cosine manner.

12. A digital communication system in accordance with claim 7, wherein
said modulating means sets said phase $\psi$ to $\pi$ radians and said phase $\theta i$ to $(0+\alpha, \pi/2+\alpha, \pi+\alpha, 3\pi/2+\alpha)$ with respect to a quaternary digital information of symbols $(11, 01, 00, 10)$.

13. A digital communication system in accordance with claim 12, wherein
said phase is shifted in a raised cosine manner.

14. A digital communication system in accordance with claim 7, wherein said modulating means set said phase $\psi$ to $(\pi/2 < \psi < 3\pi/2)$ radians or $(-\pi/2 < \psi < -3\pi/2)$ radians.

15. A digital communication system in accordance with claim 11, wherein
said phase is shifted in a raised cosine manner.

16. A digital communication system in accordance with claim 7, wherein
said phase is shifted in a raised cosine manner.

* * * * *